(12) United States Patent
Liang

(10) Patent No.: US 11,050,823 B2
(45) Date of Patent: Jun. 29, 2021

(54) METHOD, APPARATUS, AND SYSTEM FOR PLAYING SCENE ANIMATION

(71) Applicant: TENCENT TECHNOLOGY (SHENZHEN) COMPANY LIMITED, Shenzhen (CN)

(72) Inventor: Shangli Liang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 79 days.

(21) Appl. No.: 16/513,289

(22) Filed: Jul. 16, 2019

(65) Prior Publication Data

US 2019/0342386 A1 Nov. 7, 2019

Related U.S. Application Data

(63) Continuation of application No. PCT/CN2018/081607, filed on Apr. 2, 2018.

(30) Foreign Application Priority Data

May 18, 2017 (CN) .......................... 201710355474.1

(51) Int. Cl.
```
G06F 15/16      (2006.01)
H04L 29/08      (2006.01)
A63F 13/52      (2014.01)
A63F 13/60      (2014.01)
H04L 12/26      (2006.01)
H04L 29/06      (2006.01)
```

(52) U.S. Cl.
CPC .......... *H04L 67/1095* (2013.01); *A63F 13/52* (2014.09); *A63F 13/60* (2014.09);
(Continued)

(58) Field of Classification Search
CPC ....... A63F 13/52; A63F 13/60; H04L 67/1095
(Continued)

(56) References Cited

U.S. PATENT DOCUMENTS

| 2010/0178985 A1* | 7/2010 | Chickering | G06F 40/221 463/42 |
| 2013/0184083 A1* | 7/2013 | Li | A63F 13/35 463/42 |
| 2016/0239184 A1* | 8/2016 | Chapman | A63F 13/69 |

FOREIGN PATENT DOCUMENTS

| CN | 1945588 A | 4/2007 |
| CN | 101262494 A | 9/2008 |

(Continued)

OTHER PUBLICATIONS

The World Intellectual Property Organization (WIPO) International Search Report for PCT/CN2018/081607 dated Jun. 26, 2018 6 Pages (including translation).

(Continued)

*Primary Examiner* — Hannah S Wang
(74) *Attorney, Agent, or Firm* — Anova Law Group, PLLC

(57) ABSTRACT

A method, an apparatus, and a system for playing a scene animation are provided. The method includes: obtaining, by a server, scene data corresponding to a plurality of first accounts. The scene data is data generated by a plurality of first clients, each first client being logged in with one of the plurality of first accounts. The method also includes: determining, by the server according to the scene data, whether a predetermined trigger condition of playing a target scene animation is met; and sending a control message to each of the plurality of first accounts when the predetermined trigger condition of playing the target scene animation is met. The control message is used to instruct each of the plurality of first clients to synchronously play the target scene animation.

12 Claims, 7 Drawing Sheets

(52) U.S. Cl.
CPC .......... *H04L 43/106* (2013.01); *H04L 67/303* (2013.01); *H04L 67/38* (2013.01); *H04L 67/42* (2013.01); *A63F 2300/6009* (2013.01)

(58) Field of Classification Search
USPC ........................................................ 709/217
See application file for complete search history.

(56) References Cited

FOREIGN PATENT DOCUMENTS

| | | | |
|---|---|---|---|
| CN | 101577715 | A | 11/2009 |
| CN | 102497447 | A | 6/2012 |
| CN | 105025061 | A | 11/2015 |
| CN | 105099649 | A | 11/2015 |
| CN | 106559426 | A | 4/2017 |
| CN | 107302707 | A | 10/2017 |

OTHER PUBLICATIONS

The State Intellectual Property Office of the People's Republic of China (SIPO) Office Action 1 for 201710355474.1 dated Mar. 9, 2018 11 Pages (including translation).

The State Intellectual Property Office of the People's Republic of China (SIPO) Office Action 3 for 201710355474.1 dated Jul. 26, 2018 11 Pages (including translation).

* cited by examiner

METHOD, APPARATUS, AND SYSTEM FOR PLAYING SCENE ANIMATION

CROSS-REFERENCES TO RELATED APPLICATIONS

This application is a continuation application of PCT Patent Application No. PCT/CN2018/081607, filed on Apr. 2, 2018, which claims priority to Chinese Patent Application No. 201710355474.1, entitled "METHOD, APPARATUS, AND SYSTEM FOR PLAYING SCENE ANIMATION" filed with the Patent Office of China on May 18, 2017, the entire contents of both of which are incorporated herein by reference.

FIELD OF TECHNOLOGY

The present disclosure relates to the field of computers, and specifically, to a method, an apparatus, and a system for playing a scene animation.

BACKGROUND OF THE DISCLOSURE

At present, to improve the use experience of a user for an application, a scene animation is played in the application. For example, in a challenge-type game, a scene animation is used in a key phase of the development of the game story, to connect earlier and later stories of the game, or lay the groundwork for the appearance of a key character, to improve the appeal of the game. In the existing multiplayer challenge-type games, the conventional scene animation play scheme is usually used directly, that is, the trigger and control of play of the scene animation are both determined by the client. However, in a multiplayer cooperation challenge-type game, the device environment used by each player is different, and the time of joining the gate is also uncertain, and therefore the problem that play progresses of the game scene animation on different player devices are inconsistent easily occurs. Especially on a mobile terminal, due to factors such as a network delay and a network jitter, the problem of inconsistent play progresses of the scene animation will be more obvious. The phenomenon that some players have completed the display of the scene animation and enter the core combat stage, while the other players still watch the scene animation may even appear, and this severely affects the game experience of cooperation challenge of the players.

For the foregoing problems, currently, no effective solution is proposed.

SUMMARY

The embodiments of the present disclosure provide a method, an apparatus, and a system for playing a scene animation, to resolve at least the technical problem in the related technology that play progresses of a scene animation of a same application in a plurality of clients are inconsistent due to factors such as a network delay or jitter.

According to an aspect of the embodiments of the present disclosure, a method for playing a scene animation is provided. The method includes: obtaining, by a server, scene data corresponding to a plurality of first accounts. The scene data is data generated by a plurality of first clients, each first client being logged in with one of the plurality of first accounts. The method also includes: determining, by the server according to the scene data, whether a predetermined trigger condition of playing a target scene animation is met; and sending a control message to each of the plurality of first accounts when the predetermined trigger condition of playing the target scene animation is met. The control message is used to instruct each of the plurality of first clients to synchronously play the target scene animation.

According to another aspect of the embodiments of the present disclosure, a method for playing a scene animation is further provided, including: exporting scene data corresponding to a first account to a server, the scene data being data generated after the first account logs in to a client; receiving a control message returned by the server, the server being configured to: determine, according to the scene data, whether a predetermined trigger condition of playing a target scene animation is met, and return the control message when the predetermined trigger condition is met, the control message being used to instruct to play the target scene animation; and playing the target scene animation according to the control message.

According to another aspect of the embodiments of the present disclosure, an apparatus for playing a scene animation is further provided, including: an obtaining unit, configured to obtain scene data corresponding to a plurality of first accounts, the scene data being data generated after the plurality of first accounts logs in to a client; a determining unit, configured to determine, according to the scene data, whether a predetermined trigger condition of playing a target scene animation is met; and a first sending unit, configured to send a control message to each of the plurality of first accounts when the predetermined trigger condition of playing the target scene animation is met, the control message being used to instruct the client to which the plurality of first accounts logs in to synchronously play the target scene animation.

According to another aspect of the embodiments of the present disclosure, an apparatus for playing a scene animation is further provided, including: an exporting unit, configured to export scene data corresponding to a first account to a server, the scene data being data generated after the first account logs in to a client; a receiving unit, configured to receive a control message returned by the server, the server being configured to: determine, according to the scene data, whether a predetermined trigger condition of playing a target scene animation is met, and return the control message when the predetermined trigger condition is met, the control message being used to instruct to play the target scene animation; and a playing unit, configured to play the target scene animation according to the control message.

According to another aspect of the embodiments of the present disclosure, a system for playing a scene animation is further provided, including a server and a plurality of terminals each configured to execute a client. The server is configured to perform any method for playing a scene animation in the foregoing embodiments of the present disclosure, and each of the plurality of clients is configured to perform the method for playing a scene animation in the foregoing embodiments of the present disclosure. Specifically, the server is configured to obtain scene data corresponding to a plurality of first accounts, the scene data being data generated by a plurality of first clients. Each first client is executed at one of the plurality of terminals and logged in with one of the plurality of first accounts. The server is also configured to determine, according to the scene data, whether a predetermined trigger condition of playing a target scene animation is met; and send a control message to each of the plurality of first accounts when the predetermined trigger condition of playing the target scene animation is met. The control message is used to instruct each of the plurality of first clients to synchronously play the target scene animation.

According to another aspect of the embodiments of the present disclosure, non-transitory computer-readable storage medium storing computer program instructions executable by at least one processor of a terminal is provided. The computer program instructions can cause the at least one processor to perform: exporting scene data corresponding to a first account to a server, the scene data being data generated after the first account logs in to a client executed on the terminal; receiving a control message returned by the server; and playing the target scene animation according to the control message. The control message is used to instruct to play a target scene animation after the server determines, according to the scene data, that a predetermined trigger condition of playing the target scene animation is met.

In the embodiments of the present disclosure, a manner of uniformly controlling play of a scene animation by a server is used, the scene data sent by the plurality of clients is obtained, and it is determined according to the scene data whether the predetermined trigger condition of playing the target scene animation is met, and the control message is sent to all the clients when the predetermined trigger condition is met, to instruct all the clients to synchronously play the target scene animation, to ensure that play progresses of the scene animation of the application are synchronous, so as to resolve the technical problem in the related technology that play progresses of a scene animation of a same application in a plurality of clients are inconsistent due to factors such as a network delay or jitter, thereby improving use experience of users for the application.

BRIEF DESCRIPTION OF THE DRAWINGS

The accompanying drawings described herein are intended to provide further understanding of the present disclosure and constitute a part of this application. Exemplary embodiments of the present disclosure and the description thereof are used for explaining the present disclosure rather than constituting the improper limitation to the present disclosure. In the figures.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, the specification and claims of the present disclosure, and terms "first" and "second" in the foregoing accompanying drawings are used to distinguish similar objects, but are unnecessarily used to describe a specific sequence or order. It should be understood that, data used in this way is exchangeable in a proper case, so that the embodiments of the present disclosure that are described herein can be implemented in another order except those shown or described herein. Moreover, the terms "include", "comprise", and any variants thereof are intended to cover a non-exclusive inclusion. For example, a process, method, system, product, or device that includes a list of steps or units is not necessarily limited to those steps or units that are clearly listed, but may optionally further include other steps or units not expressly listed or inherent to such a process, method, product, or device.

First, some nouns or terms appearing in a process of describing the embodiments of the present disclosure are suitable for the following explanations:

Scene animation: an animation played for connecting a story change or highlighting a key event, and mainly includes close-up of a role specific state or action, a preset story dialogue, an outstanding scene change, a key story event, and the like.

According to the embodiments of the present disclosure, a method embodiment of a method for playing a scene animation is provided.

Figure 1:
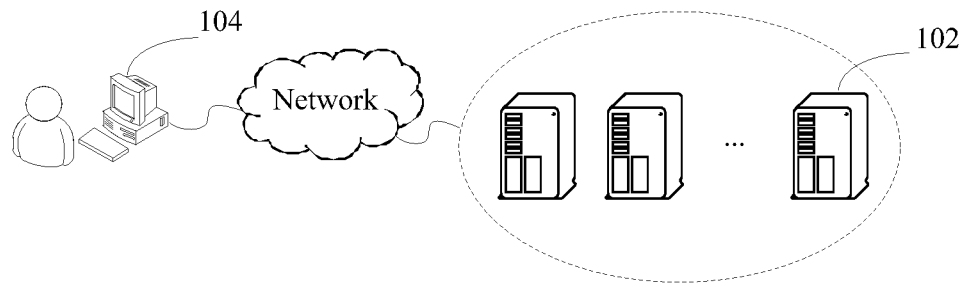
FIG. 1 is a schematic diagram of a hardware environment of a method for playing a scene animation according to an embodiment of the present disclosure.

Optionally, in some embodiments, the method for playing a scene animation may be applied to a hardware environment including a server 102 and a terminal 104 in FIG. 1. As shown in FIG. 1, the server 102 is connected to the terminal 104 through a network. The network includes but is not limited to: a wide area network, a metropolitan area network, or a local area network, and the terminal 104 is not limited to a PC, a mobile phone, a tablet computer, or the like. The method for playing a scene animation in some embodiments of the present disclosure may be performed by the server 102, or may be performed by the terminal 104, or may be performed by both the server 102 and the terminal 104. The terminal 104 performs the method for playing a scene animation in some embodiments of the present disclosure, and alternatively, the method may be performed by a client installed on the terminal 104.

It should be noted that the method for playing a scene animation in Embodiment 1 is mainly performed by both the server 102 and the terminal 104. Before the flow of the method for playing a scene animation in some embodiments of the present disclosure is described, the architecture of a scene animation playing system that performs the method for playing a scene animation is described first.

The system for playing a scene animation in some embodiments of the present disclosure may include a server and a plurality of clients. The server may be one server or a server cluster composed of a plurality of servers. The client may be a client installed on any terminal device. The terminal device may include but is not limited to a personal computer (PC for short), a mobile phone, a tablet computer, and the like. It should be noted that the server may be communicatively connected to each client, and data exchange between the server and the client may be implemented by using the communication connection.

It should be noted that the system for playing a scene animation in some embodiments of the present disclosure may use a network synchronization architecture of a dedicated-server (DS for short) type, and the network synchronization architecture mainly includes the following two points:

(1) a complete application logic is run on a server; and (2) an application state takes server data as authority, and a client performs performance simulation merely according to the server data.

The following describes the DS architecture of the system for playing a scene animation in some embodiments of the present disclosure by using a Unity game engine based mobile game application as an example.

Figure 2:
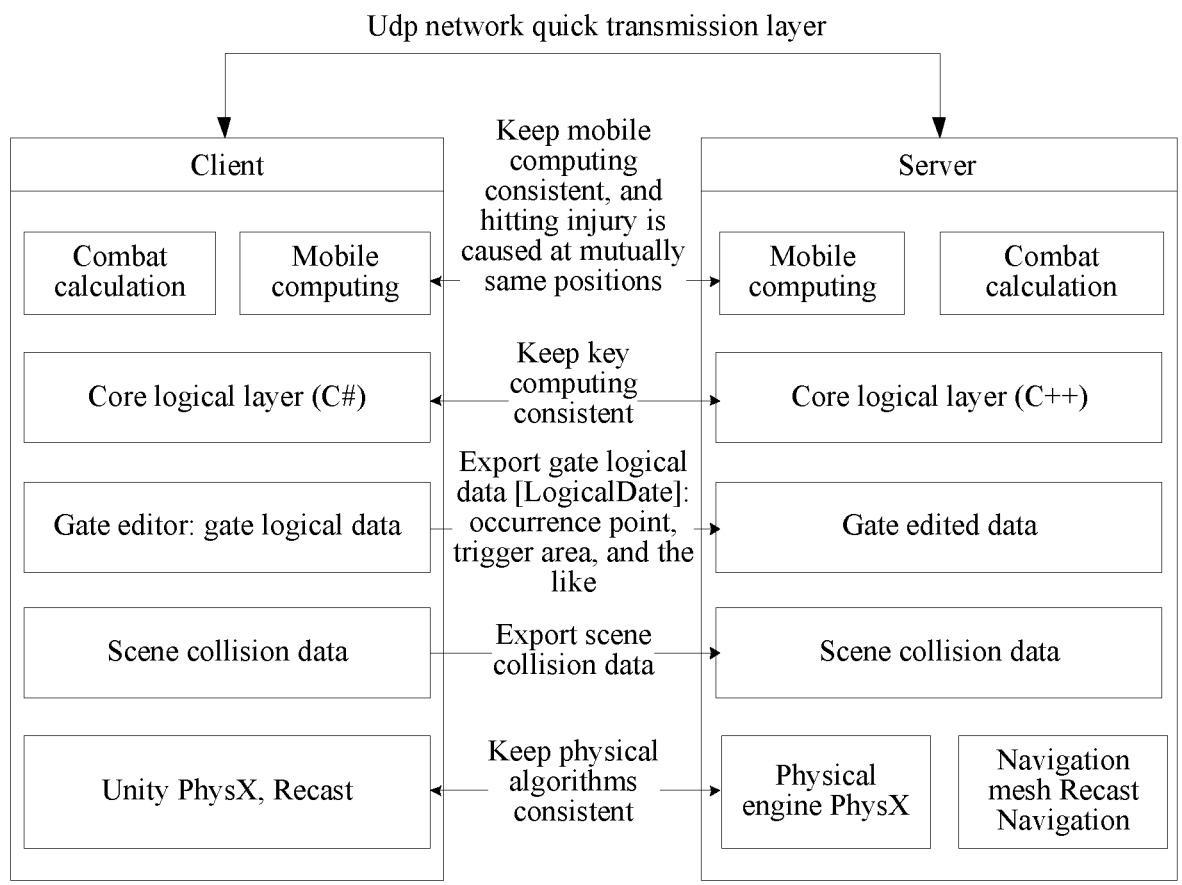
FIG. 2 is a schematic architectural diagram of an optional system for playing a scene animation according to an embodiment of the present disclosure.

FIG. 2 is a schematic architectural diagram of an optional system for playing a scene animation according to an embodiment of the present disclosure. FIG. 2 merely shows a case in which the system includes a server and a client. As shown in FIG. 2, the client performs development directly using a Unity engine, and the server selects a PhysX physical engine consistent with a Unity bottom layer and a Recast Navigation navigation mesh, to ensure consistency between physical algorithms on both sides. Scene collision data and gate logical data of the client may be exported to the server by using a custom tool, to ensure that physical environments and game configurations of both parties are consistent. The server autonomously runs a game logic depending on the data, for example, performs mobile computing and combat calculation, and drives all game processes of the client by using data delivered by a network quick transmission layer of the User Datagram Protocol (UDP for short).

Figure 3:
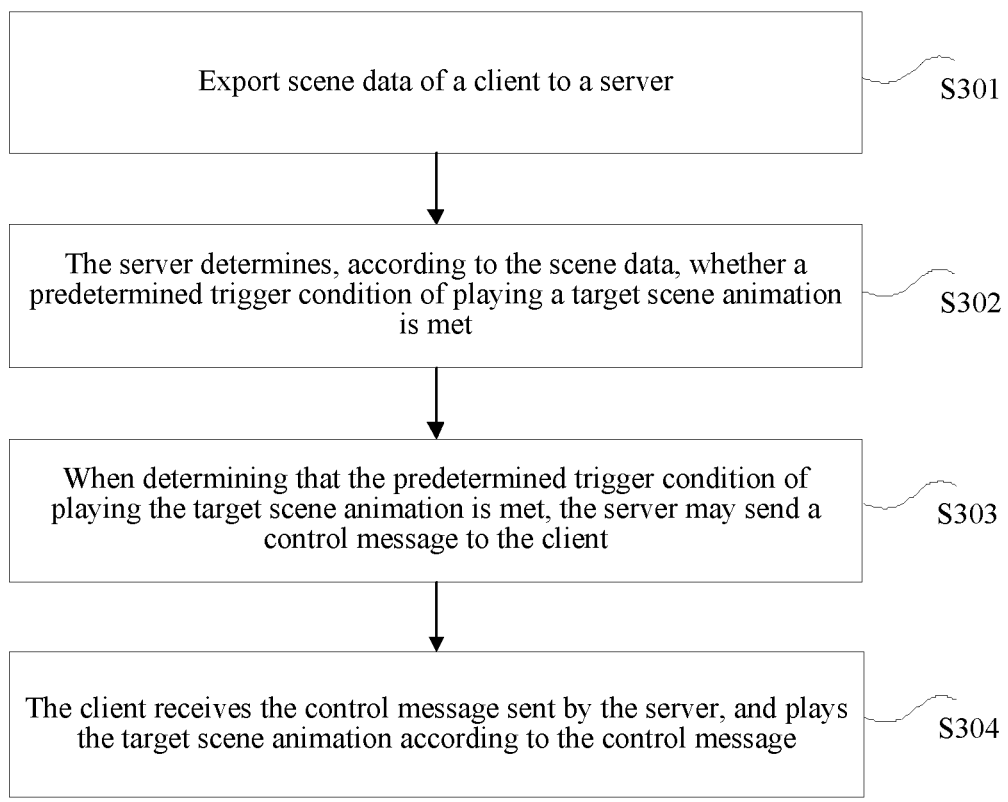
FIG. 3 is a flowchart of an optional method for playing a scene animation according to Embodiment 1 of the present disclosure.

The flow of the method for playing a scene animation that is performed in the system for playing a scene animation may be shown in FIG. 3. FIG. 3 only shows a flow of interaction between the server and one of a plurality of clients. The flow includes the following steps:

Step S301: Export scene data of a client to a server.

In step S301, an account used by a user to log in to the client may be a first account. After the first account logs in to the client (e.g., first client), data may be generated in a client running process, and the data is the scene data. For example, after the user logs in to a game application client using a game account, real time data generated in the game process such as an account level, game gold corresponding to an account, a current location of the account, and the like is collectively referred to as the scene data. In some embodiments, a plurality of accounts may participate in a same scene (e.g., game scene), the server may receive individual scene data corresponding to each first account, and obtain scene data corresponding to the plurality of first accounts. In other words, scene data corresponding to the plurality of first accounts may include and/or formed from individual scene data from each account.

It should be noted that the scene data of the client may be exported into the server by using a custom tool. Similarly, scene data of each client in the system for playing a scene animation may all be exported to the server. It should be noted herein that accounts corresponding to clients may be different.

It should further be noted that when the scene data of the client is exported to the server, in some embodiments of the present disclosure, preconfigured scene collision data, gate logical data, and the like may further be exported to the server by using a custom tool, so that the server can accurately determine whether the predetermined trigger condition of playing the target scene animation is met according to data such as the preconfigured scene collision data and gate logical data.

Step S302: The server determines, according to the scene data, whether a predetermined trigger condition of playing a target scene animation is met.

In step S302, the target scene animation is a scene animation matching the scene data. In some embodiments of the present disclosure, corresponding scene animations may be respectively configured for different scenes in the application according to actual requirements. After receiving the data such as the real time scene data and the preconfigured scene collision data and the gate logical data that is exported by the client, the server may first determine that a scene animation corresponding thereto is the target scene animation, and then determine whether the predetermined trigger condition of playing the target scene animation is met according to the data such as real time scene data and the preconfigured scene collision data and the gate logical data. It should be noted herein that the predetermined trigger condition of playing the target scene animation may be a condition preset according to an actual requirement. In an optional embodiment, the predetermined trigger condition in some embodiments of the present disclosure may include at least one of the following:

an event object corresponding to the first account enters a target area;

a residence time of the event object corresponding to the first account in the target area is greater than a predetermined time;

the first account completes a target task; and an attribute value of the first account exceeds a predetermined threshold, the attribute value including at least one of the following: an account level, an account login time, and an event resource number corresponding to an account.

In some embodiments, the predetermined trigger condition may include at least one of the following: at least one event object enters a target area, each event object corresponding to one of the plurality of first accounts; a residence time of the at least one event object in the target area is greater than a predetermined time; at least one of the plurality of first accounts completes a target task; and an attribute value of at least one of the plurality of first accounts exceeds a predetermined threshold, the attribute value comprising at least one of the following: an account level, an account login time, and an account event resource volume.

In some embodiments, the predetermined trigger condition may include at least one of the following: all event objects corresponding to the plurality of first accounts enter a target area; residence times of the all event objects in the target area is greater than a predetermined time; at least one of the plurality of first accounts or all event objects complete a target task; and an attribute value of at least one of the plurality of first accounts or all first account exceed a predetermined threshold, the attribute value comprising at least one of the following: an account level, an account login time, and an account event resource volume.

With respect to the foregoing listed predetermined trigger condition, it should be noted that the event object corresponding to the first account may be a virtual event object corresponding to the first account in a client running process. For example, the event object corresponding to the first account may be a role character in a game. The target area may be any specified area. The target task may be any specified task. The predetermined time and the predetermined threshold may be set according to actual requirements and are not limited herein. It should further be noted that the predetermined trigger condition in some embodiments of the present disclosure may further include other conditions, which are not exemplified one by one herein.

It should further be noted that the server may pre-store the predetermined trigger condition, and predetermined trigger conditions corresponding to scene animations may be different, and the server may further store a correspondence between a scene animation and a predetermined trigger condition of playing the scene animation, so that after receiving the scene data, the server may determine the predetermined trigger condition corresponding to the scene data according to the correspondence, and then determine whether the predetermined trigger condition is met according to the data such as the real time scene data and the preconfigured scene collision data and the gate logical data.

Step S303: When determining that the predetermined trigger condition of playing the target scene animation is met, the server may send a control message to the client.

In step S303, when determining that the predetermined trigger condition of playing the target scene animation is met, the server may immediately trigger a play event of the target scene animation, and send a control message to all clients respectively. The control message may be used to instruct the client to play the target scene animation, and the control message may carry a server time at which the server instructs to start to play the target scene animation. The control message may have different format for different terminals running the client (e.g., one format for terminals running Android OS and one format for terminals running IOS). The control message is used to instruct each of the plurality of clients to synchronously play the target scene animation. It should be noted herein that the server time carried in the control message is a local time of the server. Due to network factors, local times of clients may be inconsistent with the local time of the server, or local times of the clients may be inconsistent. The method for playing a scene animation in some embodiments of the present disclosure is a logical time alignment based scene animation synchronization play scheme. To be specific, the server uniformly controls play of the scene animation, so that the clients synchronously play the scene animation according to the server time.

Step S304: The client receives the control message sent by the server, and plays the target scene animation according to the control message.

In step S304, after the clients receive the control message sent by the server, play of the target scene animation may be triggered. However, because the client time is inconsistent with the server time, and transmission of the control message is delayed, to ensure that play progresses of target scene animations in all clients are consistent, the clients need to play the target scene animation according to the server time, and after receiving the control message, not all the clients necessarily start to play since the start play moment of the target scene animation.

The following describes a process of playing the target scene animation according to the control message after the control message sent by the server is received by using a client as an example, and the process of playing the target scene animation by another client is the same as the process. Optionally, after receiving the control message, the client may perform the following steps:

Step S3041: Determine a client time corresponding to the server time according to the server time carried in the control message.

It should be noted that, after receiving the control message, the client may parse in the control message to obtain the server time at which the server instructs to start to play the target scene animation. Because the local time of the client is inconsistent with the local time of the server, the client first needs to perform logical time comparison according to the server time, to determine the client time corresponding to the server time. The client time is the local time of the client.

In an optional embodiment, the determining a client time corresponding to the server time may include: obtaining a target time difference from the server; and determining the client time corresponding to the server time according to the target time difference, the client time being a sum of the server time and the target time difference.

It should be noted that the key of determining the client time corresponding to the server time lies in how to obtain a target time difference. Optionally, in some embodiments of the present disclosure, the target time difference may be obtained in the following two manners:

In the first manner, the target time difference from the server is obtained according to the following formula:

$$\text{ActualDelta} = \text{Min}(\text{ActualDelta, calculated time difference (CalcDelta)})$$

CalcDelta=real time difference between two ends (LogicTimeDelta)+transmission delay (TransmitDelay), TransmitDelay=$S1-S0$, LogicTimeDelta=$C1-S1$, $S0$ is a time at which the server sends a time comparison packet, $C1$ is a time at which the time comparison packet sent by the server is received; $S1$ is the server time at which the time comparison packet is received, and ActualDelta is the target time difference.

In the second manner, the target time difference from the server is obtained according to the following formula:

$$\text{ActualDelta} = C1 - S1 - \text{NetDelay}$$

Network delay (NetDelay)=$(C1-C0)/2$, $C0$ is a time at which a time comparison packet is sent to the server, $C1$ is a time at which a response message returned by the server in response to the time comparison packet is received, and $S1$ is a time at which the server receives the time comparison packet.

It should be noted that the target time difference may be obtained in any one of the foregoing manners, and then the target time difference is added with the server time, to obtain the client time corresponding to the server time.

Step S3042: Determine a receiving time at which the control message is received.

It should be noted that after the client time corresponding to the server time is determined by logical time comparison, for example, it is determined that the server time 9:00 corresponds to the client time 10:00, the target time difference is 1 hour. Because transmission of the control message is delayed, assuming that the delay is 1 minute, the control message sent by the server at the server time 09:00 will reach the client at the client time 10:01, that is, the receiving time at which the client receives the control message is 10:01.

Step S3043: Obtain a time stamp of current play of the target scene animation according to the client time and the receiving time.

It should be noted that because transmission of the control message is delayed, after the client receives the control message, the target scene animation has been played for a period of time. To ensure that the progress of playing the target scene animation by the client is consistent with the server, so that the progresses of playing the target scene animation by the clients are synchronous, the client needs to determine the play progress of the target scene animation when the control message is received, namely, obtain the time stamp of current play of the target scene animation according to the client time and the receiving time that are determined in the foregoing step. Optionally, the time stamp may be a time difference between the receiving time and the client time. For example, the server time 09:00 corresponds to the client time 10:00, and the receiving time at which the client receives the control message is 10:01, it indicates that the time stamp of current play of the target scene animation is 1 minute, and to ensure that the client and the server synchronously play the target scene animation, the client needs to start to play from the first minute of the target scene animation.

Step S3044: Start to play an animation after the time stamp in the target scene animation since the receiving time. In other words, the client may start to play, at the receiving time, a part of the target scene animation that begins at the time stamp. In some embodiments, after the completion of playing the target scene animation. All clients (logged in with the first accounts and the second account) may enter a same group scene to initiate next event (e.g., a group combat scene corresponding to the target scene animation based on a game logic and/or based on instruction from the server).

It should be noted that after the client determines the time stamp of current play of the target scene animation, the client may start to play the animation after the time stamp since the time stamp of the target scene animation, so that the progress of playing the target scene animation by the client is synchronous with the progress of playing the target scene animation by the server, and after all clients in the system for playing a scene animation execute a same playing process, all clients can synchronously play the target scene animation. Optionally, after the client determines the time stamp of current play of the target scene animation, the client may further play the animation in a fast-forward form since the start moment of the target scene animation, and until the fast-forward play progress reaches the progress of the target scene animation in the server, the client starts to play the subsequent animation at a normal play speed. This manner not only can ensure that all clients end playing the target scene animation at the same time, so that all clients synchronously enter a next application scene, but also can ensure that each client completely plays the target scene animation. In an actual application scenario, any one of the foregoing two manners of playing the target scene animation may be selected according to an actual requirement.

It should be noted that after receiving the control message sent by the server, all the clients in the system for playing a scene animation may execute the process of playing the target scene animation, so that all the clients in the system for playing a scene animation synchronously play the target scene animation. Because a plurality of clients and the server all synchronously play the target scene animation, when the server completes playing the target scene animation, the clients also complete playing the target scene animation.

In an optional embodiment, when the predetermined trigger condition of playing the target scene animation is met, after sending the control message to each of a plurality of first accounts, the server may further perform the following steps:

Step S1: Detect whether a request message sent by a second account is received, the request messaging being used to request to log in to the client.

Step S2: Send the control message to the second account when it is detected that the request message sent by the second account is received, the control message being used to instruct the client to which the second account logs in and the client to which the plurality of first accounts logs in to synchronously play the target scene animation.

It should be noted that the second account is an account that requests to log in to the client (e.g., second client) in a process of playing the target scene animation. When detecting the request message sent by the second account, the server may send the control message to the second account in response to the request message, the control message being mainly used to instruct the client to which the second account logs in to play the target scene animation. To ensure that all clients in the system for playing a scene animation can synchronously play the target scene animation, in the process of playing the target scene animation, after receiving the control message sent by the server, the client to which the second account logs in first needs to perform logical time comparison, and then calculate a current play progress of the target scene animation, to synchronously play the target scene animation according to the current play progress. That is, the second client may play the target scene animation from halfway based on the current play progress. It should be noted that the processing flow after the second account receives the control message is the same as the processing flow shown in step S3041 to step S3044, and the difference lies only in that the current play progresses of the target scene animation that are obtained through calculation are different.

In this optional embodiment, the client to which the account requesting to log in to the client in the process of playing the target scene animation logs in and other clients synchronously play the target scene animation, thereby improving use experience of users for the application.

The present disclosure further provides an optional embodiment. This optional embodiment is an optional example in which the method for playing a scene animation in some embodiments of the present disclosure is applied to the field of games. Before this optional embodiment is described in detail, the following terms are briefly described herein first.

FPS phone game: a first-person shooting game that runs on a mobile phone terminal.

PVE: player versus AI, referring to that in the game, the player challenges NPC monster and BOSS that are controlled by a game program.

NPC: a non-player controlled role, referring to a monster role that can be killed by the player in the game herein.

BOSS: a monster leader in a gate.

Scene animation: an animation played for connecting a story change or highlighting a key event, and mainly includes close-up of a role specific state or action, a preset story dialogue, an outstanding scene change, a key story event, and the like.

This optional embodiment provides a logical time alignment based scene animation synchronization scheme. The server uniformly controls trigger and play progresses of the scene animation, and all mobile devices and the server perform time comparison and real time correction, to ensure synchronous scene animation progresses, thereby improving game experience of the player.

It should be noted that, in this scheme, the creation and play of the scene animation are still executed on the client, but the condition of triggering play and the play progress are uniformly controlled and delivered by the server. All scene animations and trigger conditions thereof of the client may be exported as a uniform configuration by using a tool. The server reads the configuration, and delivers a scene animation trigger event and the current progress according to the current game progress and the game state, to drive synchronous play of the scene animation in the client.

In an optional application scenario, for example, in an FPS phone game, multiplayer PVE challenge is used as one of game core play methods, and includes rich game backgrounds and game stories. Therefore, in the game process of multiplayer PVE play method, a scene animation technology also needs to be used to promote the development of the game story. To ensure that the scene animations on different player devices are synchronized, the FPS phone game uses the game scene animation synchronization play technology proposed in this scheme to complete the design and real time play of the scene animation.

It should be noted that the game artist can use the scene animation editing tool to complete the creation of the scene animation content, including the control of the role action, the trigger of the scene effect, the play of the scene sound effect, and the like. In a scene animation, all content is controlled by a unified timeline. The timeline directly affects the play progress of the scene animation, and supports fast-forward, fixed-point play and other features.

It should further be noted that during game planning, the task flow of the entire gate needs to be configured according to the story requirement, and when the specific task is triggered or completed, play information of the corresponding scene animation is configured, and mainly includes the trigger condition of the scene animation, the duration of the animation, whether local characters need to be hidden, whether a camera needs to be switched and rendered, and the like.

Through the foregoing pre-configuration, the server can dynamically trigger the corresponding scene animation play event according to the task flow configuration information and the scene animation configuration information during the game, and drive the game story development.

In the scene animation synchronization technology proposed in this scheme, the trigger and play of the scene animation are uniformly driven and controlled by the server. Therefore, the technical basis of implementation of the scheme is that the game uses a network synchronization architecture of a DS type, and the network synchronization architecture mainly includes the following two features:

(1) a complete game logic is run on a server; and (2) a game state takes server data as authority, and a client performs performance simulation merely according to the data.

With respect to a Unity game engine based mobile game, this scheme provides a practical implementation of a DS architecture. In this implementation, the client performs development directly using a Unity engine, and the server selects a PhysX physical component consistent with a Unity bottom layer and a Recast Navigation navigation component, to ensure consistency between physical algorithms on both sides. Scene collision data and gate logical data of the client is exported to the server by using a custom tool, to ensure that physical environments and game configurations of both parties are consistent. The server autonomously runs a game logic depending on the data, and drives all game processes of the client by using data delivered by a network, and the main logical architecture may be shown in FIG. 2.

Figure 4:
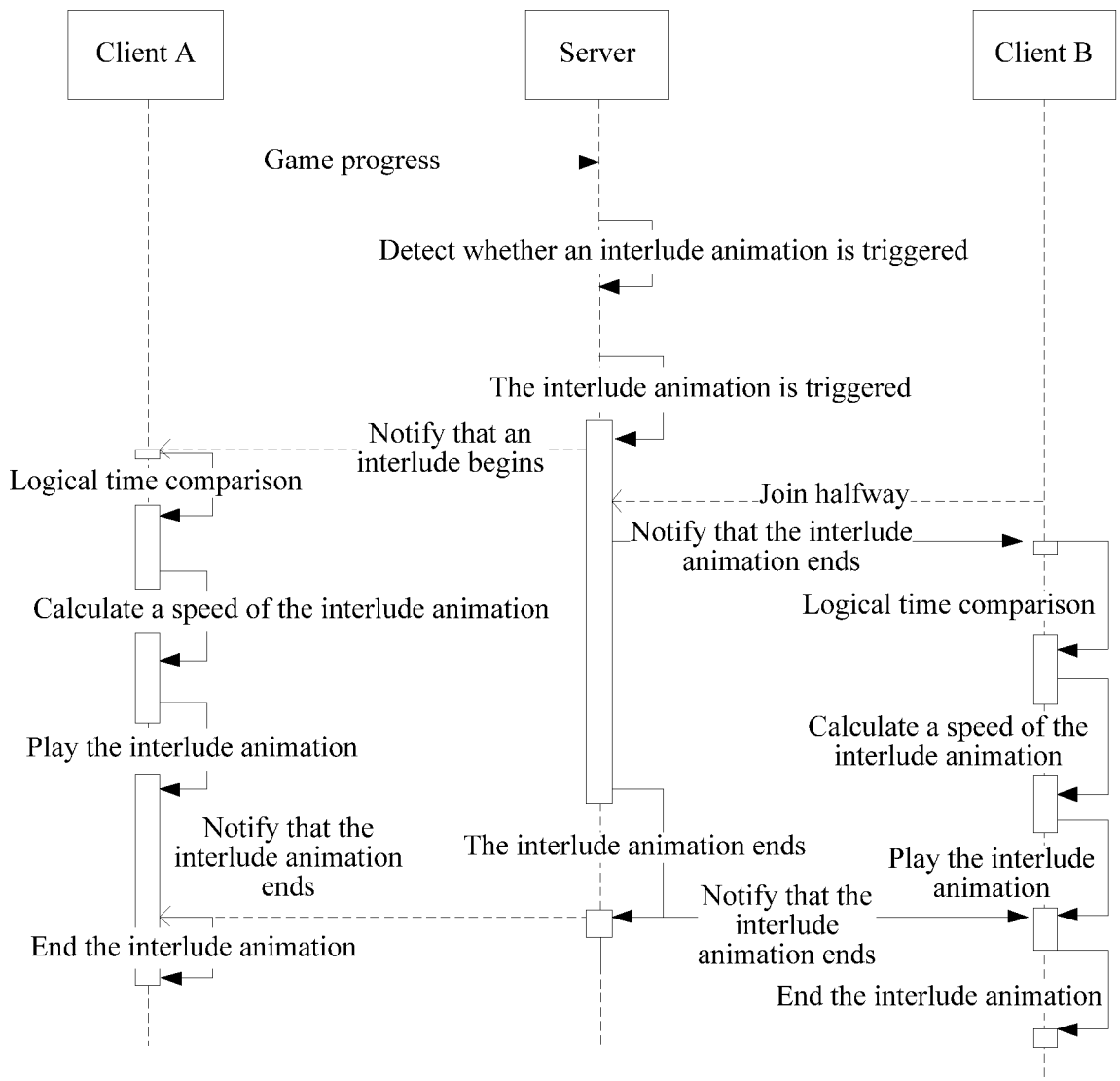
FIG. 4 is a sequence diagram of a scene animation synchronous interaction process according to an optional embodiment of the present disclosure.

The scene animation synchronization interaction flow in the scheme may be shown in FIG. 4, and may optionally be described as: during the game of the player, that is, during the game progress, the server continuously detects whether the scene animation is triggered. That is, the server continuously detects whether the player has met the requirement of playing the scene animation pre-configured during game planning. When it is detected that a scene animation requirement is met, the scene animation play event is triggered and sent to all players currently connected to the round of the game by using a network, such as the client A in FIG. 4. After receiving the delivered event, the client A first performs logical time comparison, and then calculates the play progress of the scene animation, and plays the scene animation according to the current play progress. For the player who joins in the middle of the scene animation play process, for example, the client B in FIG. 4, the server will deliver, for supplementation, the corresponding scene animation play event, and the new player client B will first perform logical time comparison after receiving the event. Then, according to the data delivered by the server, the current play progress of the scene animation is calculated, and the play starts directly from the progress point, thereby ensuring consistency with the current progress of other players.

It should be noted that, for a multiplayer cooperation challenge-type game, a player is usually allowed to join in the middle of the game, which may cause the timeline of the server to be inconsistent with the timeline of the client, or the timelines between different clients to be inconsistent. To achieve synchronous play of a scene animation, it needs to be ensured that all clients and the server have a unified logical timeline. In the DS architecture shown in FIG. 2, each client interacts with the server separately, and therefore the logical time comparison is also completed separately by each client and the server.

Figure 5:
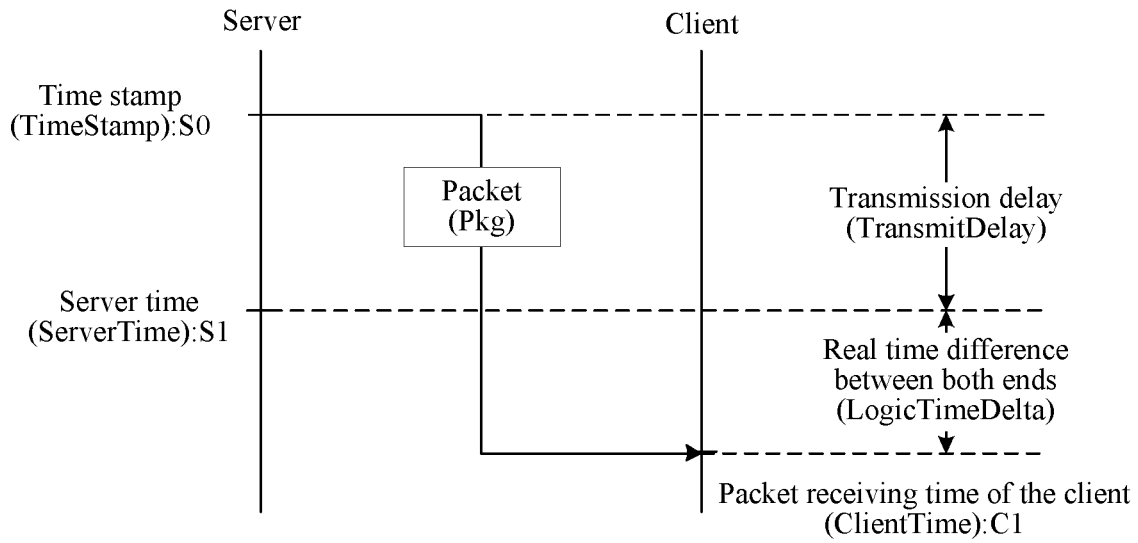
FIG. 5 is a schematic diagram of an optional logical time comparison according to an optional embodiment of the present disclosure.

The algorithm during logical time comparison is described as follows:

As shown in FIG. 5, the server sends a packet Pkg at the time of $S0$, and the client receives the packet at the local time $C1$. At this time, the corresponding time of the server is $S1$, and we need to learn the difference between $C1$ and $S1$, and the difference is denoted as LogicTimeDelta. Because the server sends the data packet at $S0$, and the data packet is sent to the client at $S1$, the network delay at this time is $S1-S0$. When the client receives the packet at the time of $C1$, because the packet includes the time stamp at which the server sends the packet, a difference value CalcDelta may be calculated, which is actually the sum of the time difference LogicTimeDelta between both ends and the transmission delay TransmitDelay.

$$TransmitDelay = S1 - S0;$$

$$LogicTimeDelta = C1 - S1;$$

$$CalcDelta = C1 - S0 = LogicTimeDelta + TransmitDelay$$

If the network delay at that time is smaller, the difference value is closer to the real time difference. Therefore, the value may be continuously monitored during the game and the minimum value thereof is maintained, to obtain a stable time difference ActualDelta between both ends, for performing time comparison between both ends. When receiving the time ServerTime specified by the server, the client can calculate its corresponding client time ClientTime through the time difference between both ends.

ActualDelta=Min(ActualDelta, CalcDelta)

ClientTime=ServerTimeStamp+ActualDelta

Figure 6:
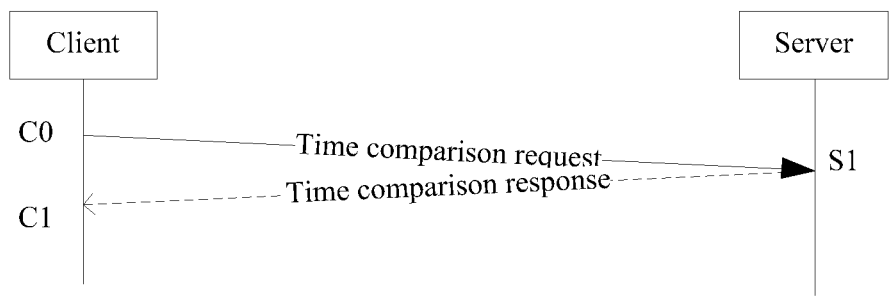
FIG. 6 is a schematic diagram of another optional logical time comparison according to an optional embodiment of the present disclosure.

Optionally, in addition to using the minimum difference algorithm described above, the logical time comparison may also be implemented by using a dedicated logical time comparison packet. As shown in FIG. 6, the client sends a time comparison request packet to the server at the moment C0, and the server receives the request at a moment S1, and immediately replies time comparison information. The client receives the response of the server at the time of C1, and the time difference between both ends may be calculated in the following manner:

NetDelay=($C1-C0$)/2

ActualDelta=$C1-S1$-NetDelay

After the time difference ActualDelta between both ends is obtained, the client may convert the server time Server-Time into the corresponding local time ClientTime:

ClientTime=ServerTime+ActualDelta

It should be noted that use of the scene animation synchronization technology proposed in this scheme can ensure the consistency and synchronization of game scene animations on different player devices in multiplayer challenge-type games, to greatly improve the game experience of player cooperation challenge.

It should be noted that, for ease of description, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, a person skilled in the art should also understand that the embodiments described in this specification all belong to optional embodiments, and the involved actions and modules are not necessarily mandatory to the present disclosure.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of the present disclosure essentially, or the part contributing to related technologies may be implemented in a form of a software product. The computer software product is stored in a storage medium (such as a read-only memory (ROM)/random access memory (RAM), a magnetic disk, or an optical disc) and includes several instructions for instructing a computer device (which may be a mobile phone, a computer, a server, a network device, or the like) to perform the methods described in the embodiments of the present disclosure.

A method for playing a scene animation is provided. It should be noted that the method for playing a scene animation may be performed by the server shown in FIG. 1 and FIG. 2.

Figure 7:
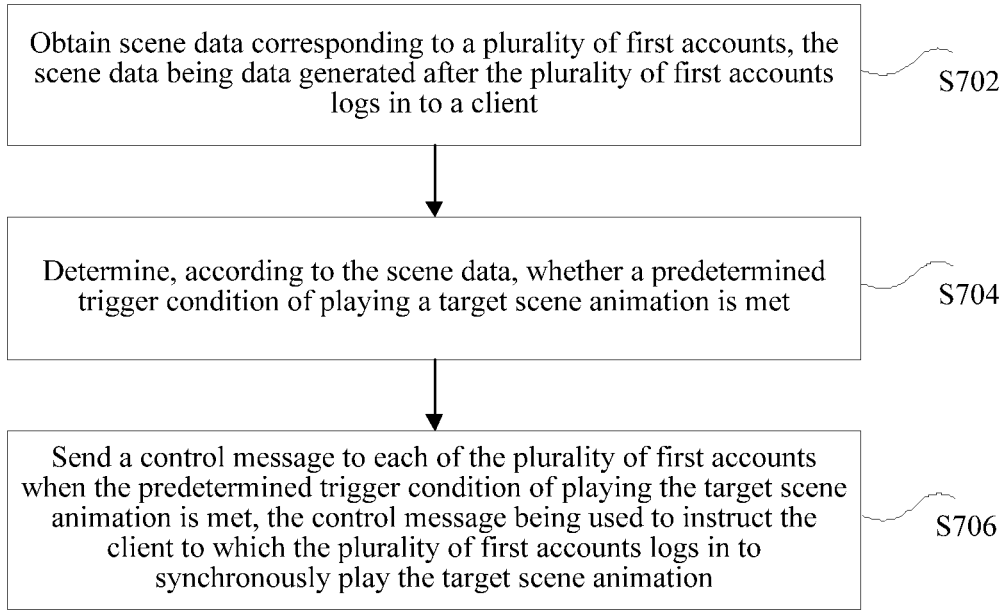
FIG. 7 is a flowchart of an optional method for playing a scene animation according to Embodiment 2 of the present disclosure.

FIG. 7 is a flowchart of an optional method for playing a scene animation according to Embodiment 2 of the present disclosure. As shown in FIG. 7, the method may include the following steps:

Step S702: Obtain scene data corresponding to a plurality of first accounts, the scene data being data generated after the plurality of first accounts logs in to a client.

Step S704: Determine, according to the scene data, whether a predetermined trigger condition of playing a target scene animation is met.

Step S706: Send a control message to each of the plurality of first accounts when the predetermined trigger condition of playing the target scene animation is met, the control message being used to instruct the client to which the plurality of first accounts logs in to synchronously play the target scene animation.

It should be noted that the foregoing step S702 to step S706 are described in detail in step S301 to step S304 (including step S3041 to step S3044) in Embodiment 1 of the present disclosure, and details are not described one by one herein again.

In the foregoing step S702 to step S706, the scene data sent by the plurality of clients is obtained, and it is determined according to the scene data whether the predetermined trigger condition of playing the target scene animation is met, and the control message is sent to all the clients when the predetermined trigger condition is met, to instruct all the clients to synchronously play the target scene animation, to ensure that play progresses of the scene animation of the application are synchronous, so as to resolve the technical problem in the related technology that play progresses of a scene animation of a same application in a plurality of clients are inconsistent due to factors such as a network delay or jitter, thereby improving use experience of users for the application.

In an optional embodiment, after the sending a control message to each of the plurality of first accounts when the predetermined trigger condition of playing the target scene animation is met, the server may further perform the following steps: detecting whether a request message sent by a second account is received, the request messaging being used to request to log in to the client; and sending the control message to the second account when it is detected that the request message sent by the second account is received, the control message being used to instruct the client to which the second account logs in and the client to which the plurality of first accounts logs in to synchronously play the target scene animation.

It should be noted that the second account is an account that requests to log in to the client in a process of playing the target scene animation. When detecting the request message sent by the second account, the server may send the control message to the second account in response to the request message, the control message being mainly used to instruct the client to which the second account logs in to play the target scene animation. To ensure that all clients in the system for playing a scene animation can synchronously play the target scene animation, in the process of playing the target scene animation, after receiving the control message sent by the server, the client to which the second account logs in first needs to perform logical time comparison, and then calculate a current play progress of the target scene animation, to synchronously play the target scene animation according to the current play progress. It should be noted that the processing flow after the second account receives the control message is the same as the processing flow shown in step S3041 to step S3044 in Embodiment 1 of the present disclosure, and the difference lies only in that the current play progresses of the target scene animation that are obtained through calculation are different.

In this optional embodiment, the client to which the account requesting to log in to the client in the process of playing the target scene animation logs in and other clients synchronously play the target scene animation, thereby improving use experience of users for application.

In an optional embodiment, the predetermined trigger condition may include at least one of the following: an event object corresponding to the first account enters a target area; a residence time of the event object corresponding to the first account in the target area is greater than a predetermined time; the first account completes a target task; and an attribute value of the first account exceeds a predetermined threshold, the attribute value including at least one of the following: an account level, an account login time, and an event resource number corresponding to an account.

It should be noted that the event object corresponding to the first account may be a virtual event object corresponding to the first account in a client running process. For example, the event object corresponding to the first account may be a role character in a game. The target area may be any specified area. The target task may be any specified task. The predetermined time and the predetermined threshold may be set according to actual requirements and are not limited herein. It should further be noted that the predetermined trigger condition in some embodiments of the present disclosure may further include other conditions, which are not exemplified one by one herein.

It should be noted that, for ease of description, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, a person skilled in the art should also understand that the embodiments described in this specification all belong to optional embodiments, and the involved actions and modules are not necessarily mandatory to the present disclosure.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of the present disclosure essentially, or the part contributing to related technologies may be implemented in a form of a software product. The computer software product is stored in a storage medium (such as a read-only memory (ROM)/random access memory (RAM), a magnetic disk, or an optical disc) and includes several instructions for instructing a computer device (which may be a mobile phone, a computer, a server, a network device, or the like) to perform the methods described in the embodiments of the present disclosure.

A method for playing a scene animation is also provided in Embodiment 3. It should be noted that the method for playing a scene animation may be performed by the client shown in FIG. 1 and FIG. 2.

Figure 8:
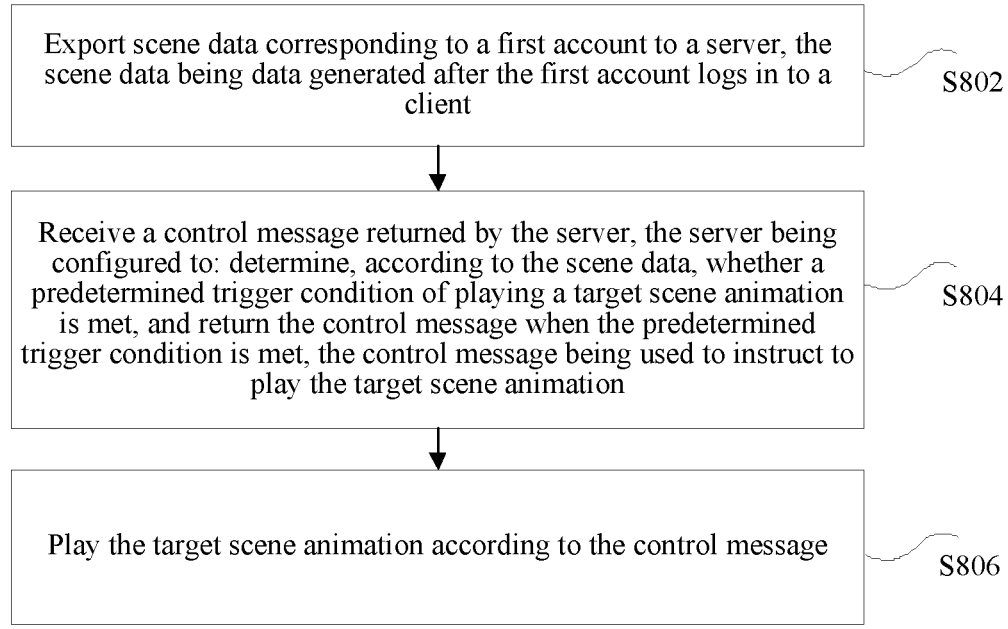
FIG. 8 is a flowchart of an optional method for playing a scene animation according to Embodiment 3 of the present disclosure.

FIG. 8 is a flowchart of an optional method for playing a scene animation according to Embodiment 3 of the present disclosure. As shown in FIG. 8, the method may include the following steps:

Step S802: Export scene data corresponding to a first account to a server, the scene data being data generated after the first account logs in to a client.

Step S804: Receive a control message returned by the server, the server being configured to: determine, according to the scene data, whether a predetermined trigger condition of playing a target scene animation is met, and return the control message when the predetermined trigger condition is met, the control message being used to instruct to play the target scene animation.

Step S806: Play the target scene animation according to the control message.

It should be noted that the foregoing step S802 to step S806 are described in detail in step S301 to step S304 (including step S3041 to step S3044) in Embodiment 1 of the present disclosure, and details are not described one by one herein again.

In the foregoing step S802 to step S806, the scene data sent by the plurality of clients is obtained, and it is determined according to the scene data whether the predetermined trigger condition of playing the target scene animation is met, and the control message is sent to all the clients when the predetermined trigger condition is met, to instruct all the clients to synchronously play the target scene animation, to ensure that play progresses of the scene animation of the application are synchronous, so as to resolve the technical problem in the related technology that play progresses of a scene animation of a same application in a plurality of clients are inconsistent due to factors such as a network delay or jitter, thereby improving use experience of users for the application.

In an optional embodiment, the control message carries a server time at which the server instructs to start to play the target scene animation, and step S806 of playing the target scene animation according to the control message may include: determining a client time corresponding to the server time; determining a receiving time at which the control message is received; obtaining a time stamp of current play of the target scene animation according to the client time and the receiving time, the time stamp being a time difference between the receiving time and the client time; and starting to play an animation after the time stamp in the target scene animation since the receiving time.

Optionally, the determining a client time corresponding to the server time may include: obtaining a target time difference from the server; and determining the client time corresponding to the server time according to the target time difference, the client time being a sum of the server time and the target time difference.

Optionally, in this optional embodiment, the target time difference from the server may be obtained according to the following formula: ActualDelta=Min(ActualDelta, CalcDelta), where CalcDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received; S1 is the server time at which the time comparison packet is received, and ActualDelta is the target time difference.

Optionally, in this optional embodiment, the target time difference from the server may be obtained according to the following formula: ActualDelta=C1−S1−NetDelay, where NetDelay=(C1−C0)/2, C0 is a time at which a time comparison packet is sent to the server, C1 is a time at which a response message returned by the server in response to the time comparison packet is received, and S1 is a time at which the server receives the time comparison packet.

It should be noted that this optional embodiment is described in detail in step S3041 to step S3044 in Embodiment 1 of the present disclosure, and details are not described one by one herein again.

It should be noted that, for ease of description, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, a person skilled in the art should also understand that the embodiments described in this specification all belong to optional embodiments, and the involved actions and modules are not necessarily mandatory to the present disclosure.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of the present disclosure essentially, or the part contributing to related technologies may be implemented in a form of a software product. The computer software product is stored in a storage medium (such as a read-only memory (ROM)/random access memory (RAM), a magnetic disk, or an optical disc) and includes several instructions for instructing a computer device (which may be a mobile phone, a computer, a server, a network device, or the like) to perform the methods described in the embodiments of the present disclosure.

Figure 9:
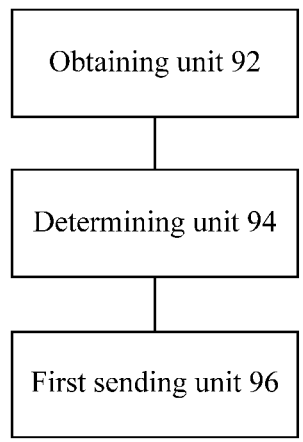
FIG. 9 is a schematic diagram of an optional apparatus for playing a scene animation according to Embodiment 4 of the present disclosure.

According to an embodiment of the present disclosure, a scene animation playing apparatus configured to implement the method for playing a scene animation in Embodiment 2 of the present disclosure is further provided. FIG. 9 is a schematic diagram of an optional apparatus for playing a scene animation according to Embodiment 4 of the present disclosure. As shown in FIG. 9, the apparatus may include:

an obtaining unit 92, configured to obtain scene data corresponding to a plurality of first accounts, the scene data being data generated after the plurality of first accounts logs in to a client; a determining unit 94, configured to determine, according to the scene data, whether a predetermined trigger condition of playing a target scene animation is met; and a first sending unit 96, configured to send a control message to each of the plurality of first accounts when the predetermined trigger condition of playing the target scene animation is met, the control message being used to instruct the client to which the plurality of first accounts logs in to synchronously play the target scene animation.

It should be noted that the obtaining unit 92 in some embodiments may be configured to perform step S702 in Embodiment 1 of this application, the determining unit 94 in some embodiments may be configured to perform step S704 in Embodiment 1 of this application, and the first sending unit 96 in some embodiments may be configured to perform step S706 in Embodiment 1 of this application.

It should be noted herein that examples and application scenarios implemented by the foregoing modules and corresponding steps are the same but are not limited to the content disclosed in the foregoing Embodiment 2. It should be noted that the foregoing modules may be run on the server shown in FIG. 1 or FIG. 2 as a part of the apparatus, and may be implemented through software, or may be implemented through hardware.

In an optional embodiment, the optional embodiment may further include: a detection unit, configured to: after the sending a control message to each of the plurality of first accounts when the predetermined trigger condition of playing the target scene animation is met, detect whether a request message sent by a second account is received, the request messaging being used to request to log in to the client; and a second sending unit, configured to send the control message to the second account when it is detected that the request message sent by the second account is received, the control message being used to instruct the client to which the second account logs in and the client to which the plurality of first accounts logs in to synchronously play the target scene animation.

In an optional embodiment, the predetermined trigger condition may include at least one of the following: an event object corresponding to the first account enters a target area; a residence time of the event object corresponding to the first account in the target area is greater than a predetermined time; the first account completes a target task; and an attribute value of the first account exceeds a predetermined threshold, the attribute value including at least one of the following: an account level, an account login time, and an event resource number corresponding to an account.

By using the foregoing modules, the technical problem in the related technology that play progresses of a scene animation of a same application in a plurality of clients are inconsistent due to factors such as a network delay or jitter can be resolved, thereby improving use experience of users for the application.

Figure 10:
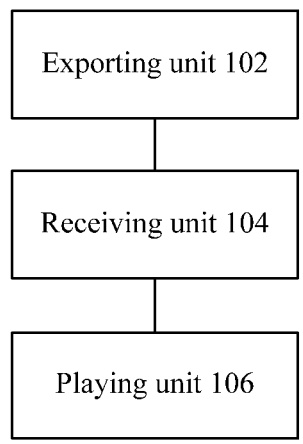
FIG. 10 is a schematic diagram of an optional apparatus for playing a scene animation according to Embodiment 5 of the present disclosure.

According to an embodiment of the present disclosure, a scene animation playing apparatus configured to implement the method for playing a scene animation in Embodiment 3 of the present disclosure is further provided. FIG. 10 is a schematic diagram of an optional apparatus for playing a scene animation according to Embodiment 5 of the present disclosure. As shown in FIG. 10, the apparatus may include:

an exporting unit 102, configured to export scene data corresponding to a first account to a server, the scene data being data generated after the first account logs in to a client; a receiving unit 104, configured to receive a control message returned by the server, the server being configured to: determine, according to the scene data, whether a predetermined trigger condition of playing a target scene animation is met, and return the control message when the predetermined trigger condition is met, the control message being used to instruct to play the target scene animation; and a playing unit 106, configured to play the target scene animation according to the control message.

It should be noted that the exporting unit 102 in some embodiments may be configured to perform step S802 in Embodiment 1 of this application, the receiving unit 104 in some embodiments may be configured to perform step S804 in Embodiment 1 of this application, and the playing unit 106 in some embodiments may be configured to perform step S806 in Embodiment 1 of this application.

It should be noted herein that examples and application scenarios implemented by the foregoing modules and corresponding steps are the same but are not limited to the content disclosed in the foregoing Embodiment 3. It should be noted that the foregoing modules may be run on the client shown in FIG. 1 or FIG. 2 as a part of the apparatus, and may be implemented through software, or may be implemented through hardware.

In an optional embodiment, the control message carries a server time at which the server instructs to start to play the target scene animation, and the playing unit 106 may include: a first determining module, configured to determine a client time corresponding to the server time; a second determining module, configured to determine a receiving time at which the control message is received; an obtaining module, configured to obtain a time stamp of current play of the target scene animation according to the client time and the receiving time, the time stamp being a time difference between the receiving time and the client time; and a playing module, configured to start to play an animation after the time stamp in the target scene animation since the receiving time.

In an optional embodiment, the first determining module may include: an obtaining submodule, configured to obtain a target time difference from the server; and a determining submodule, configured to determine the client time corresponding to the server time according to the target time difference, the client time being a sum of the server time and the target time difference.

In an optional embodiment, the obtaining submodule is configured to obtain the target time difference from the server according to the following formula: ActualDelta=Min (ActualDelta, CalcDelta), where CalcDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received; S1 is the server time at which the time comparison packet is received, and ActualDelta is the target time difference.

In an optional embodiment, the obtaining submodule is configured to obtain the target time difference from the server according to the following formula: ActualDelta=C1−S1−NetDelay, where NetDelay=(C1−C0)/2, C0 is a time at which a time comparison packet is sent to the server, C1 is a time at which a response message returned by the server in response to the time comparison packet is received, and S1 is a time at which the server receives the time comparison packet.

By using the foregoing modules, the technical problem in the related technology that play progresses of a scene animation of a same application in a plurality of clients are inconsistent due to factors such as a network delay or jitter can be resolved, thereby improving use experience of users for the application.

According to an embodiment of the present disclosure, an electronic apparatus configured to implement the foregoing method for playing a scene animation is further provided.

Figure 11:
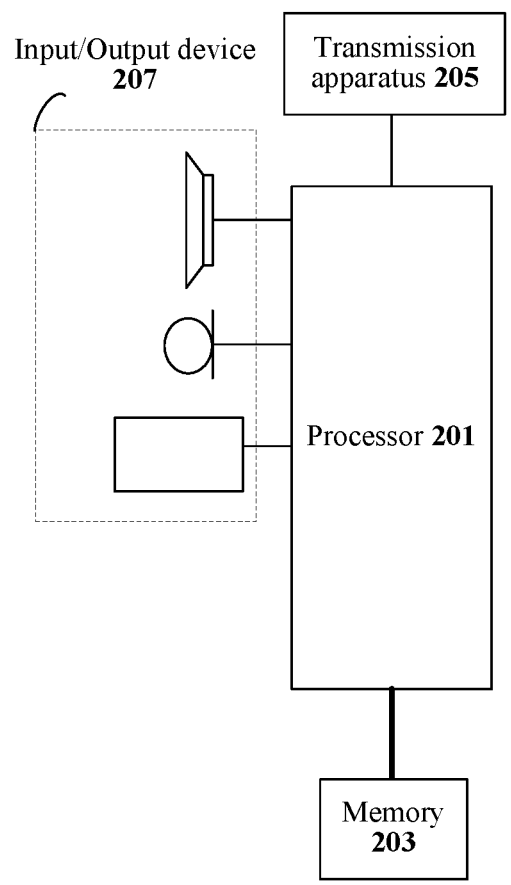
FIG. 11 is a structural block diagram of an electronic apparatus according to an embodiment of the present disclosure.

FIG. 11 is a structural block diagram of an electronic apparatus according to an embodiment of the present disclosure. As shown in FIG. 11, the electronic apparatus may include: one or more (where only one is shown) processors 201, a memory 203, and a transmission apparatus 205. As shown in FIG. 11, the electronic apparatus may further include an input/output device 207.

The memory 203 may be configured to store a computer program and a module, for example, the program instruction/module corresponding to the method and apparatus for playing a scene animation in the embodiments of the present disclosure. The processor 201 is configured to run a software program and a module that are stored in the memory 203 to execute various functional applications and perform data processing, that is, implement the foregoing method for playing a scene animation. The memory 203 may include a high-speed random memory, and may also include a non-volatile memory such as one or more magnetic storage apparatuses, a flash memory, or another nonvolatile solid-state memory. In some embodiments, the memory 203 may further include memories remotely disposed relative to the processor 201, and these remote memories may be connected to the terminal through a network. Examples of the network include, but are not limited to, the Internet, an intranet, a local area network, a mobile communications network, and a combination thereof.

The transmission apparatus 205 is configured to receive or send data through a network. Examples of the foregoing network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module that is configured to communicate with the Internet in a wireless manner.

Optionally, the memory 203 is configured to store an application program.

The processor 201 may invoke the application program stored in the memory 203 to perform the following steps: obtaining scene data corresponding to a plurality of first accounts, the scene data being data generated after the plurality of first accounts logs in to a client; determining, according to the scene data, whether a predetermined trigger condition of playing a target scene animation is met; and sending a control message to each of the plurality of first accounts when the predetermined trigger condition of playing the target scene animation is met, the control message being used to instruct the client to which the plurality of first accounts logs in to synchronously play the target scene animation.

The processor 201 is further configured to perform the following steps: after the sending a control message to each of the plurality of first accounts when the predetermined trigger condition of playing the target scene animation is met, detecting whether a request message sent by a second account is received, the request messaging being used to request to log in to the client; and sending the control message to the second account when it is detected that the request message sent by the second account is received, the control message being used to instruct the client to which the second account logs in and the client to which the plurality of first accounts logs in to synchronously play the target scene animation.

The processor 201 may invoke the application program stored in the memory 203, to perform the following steps: exporting scene data corresponding to a first account to a server, the scene data being data generated after the first account logs in to a client; receiving a control message returned by the server, the server being configured to: determine, according to the scene data, whether a predetermined trigger condition of playing a target scene animation is met, and return the control message when the predetermined trigger condition is met, the control message being used to instruct to play the target scene animation; and playing the target scene animation according to the control message.

The processor 201 is further configured to perform the following steps: determining a client time corresponding to the server time; determining a receiving time at which the control message is received; obtaining a time stamp of current play of the target scene animation according to the client time and the receiving time, the time stamp being a time difference between the receiving time and the client time; and starting to play an animation after the time stamp in the target scene animation since the receiving time.

The processor 201 is further configured to perform the following steps: obtaining a target time difference from the server; and determining the client time corresponding to the server time according to the target time difference, the client time being a sum of the server time and the target time difference.

The processor 201 is further configured to perform the following step: obtaining the target time difference from the server according to the following formula: ActualDelta=Min(ActualDelta, CalcDelta), where CalcDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received; S1 is the server time at which the time comparison packet is received, and ActualDelta is the target time difference.

The processor 201 is further configured to perform the following step: obtaining the target time difference from the server according to the following formula: ActualDelta=C1−S1−NetDelay, where NetDelay=(C1−C0)/2, C0 is a time at which a time comparison packet is sent to the server, C1 is a time at which a response message returned by the server in response to the time comparison packet is received, and S1 is a time at which the server receives the time comparison packet.

In some embodiments of the present disclosure, a play scheme of a scene animation is provided. In this scheme, a manner of uniformly controlling play of a scene animation by a server is used, the scene data sent by the plurality of clients is obtained, and it is determined according to the scene data whether the predetermined trigger condition of playing the target scene animation is met, and the control message is sent to all the clients when the predetermined trigger condition is met, to instruct all the clients to synchronously play the target scene animation, to ensure that play progresses of the scene animation of the application are synchronous, so as to resolve the technical problem in the related technology that play progresses of a scene animation of a same application in a plurality of clients are inconsistent due to factors such as a network delay or jitter, thereby improving use experience of users for the application.

Optionally, reference may be made to examples described in the Embodiment 1 to Embodiment 5 for optional examples in some embodiments, and details are not described herein again.

A person of ordinary skill in the art may understand that, the structure shown in FIG. 11 is only schematic. The terminal may be a terminal device such as a smartphone (such as an Android mobile phone or an iOS mobile phone), a tablet computer, a palmtop computer, a mobile Internet device (MID), or a PAD. FIG. 11 does not limit the structure of the foregoing electronic apparatus. For example, the terminal may further include more or less components (such as a network interface and a display apparatus) than those shown in FIG. 11, or has a configuration different from that shown in FIG. 11.

Persons of ordinary skill in the art may understand that all or some of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

An embodiment of the present disclosure further provides a storage medium. Optionally, in some embodiments, the storage medium stores a computer program. The computer program, when run, is configured to perform the method for playing a scene animation.

Optionally, in some embodiments, the storage medium may be located in at least one of a plurality network devices in the network shown in the foregoing embodiments.

Optionally, in some embodiments, the storage medium is configured to store program code for performing the following steps:

S1: Obtaining scene data corresponding to a plurality of first accounts, the scene data being data generated after the plurality of first accounts logs in to a client.

S2: Determining, according to the scene data, whether a predetermined trigger condition of playing a target scene animation is met.

S3: Sending a control message to each of the plurality of first accounts when the predetermined trigger condition of playing the target scene animation is met, the control message being used to instruct the client to which the plurality of first accounts logs in to synchronously play the target scene animation.

Optionally, the storage medium is further configured to store program code for performing the following steps: after the sending a control message to each of the plurality of first accounts when the predetermined trigger condition of playing the target scene animation is met, detecting whether a request message sent by a second account is received, the request messaging being used to request to log in to the client; and sending the control message to the second account when it is detected that the request message sent by the second account is received, the control message being used to instruct the client to which the second account logs in and the client to which the plurality of first accounts logs in to synchronously play the target scene animation.

Optionally, in some embodiments, the storage medium is configured to store program code for performing the following steps:

S1: Exporting scene data corresponding to a first account to a server, the scene data being data generated after the first account logs in to a client.

S2: Receiving a control message returned by the server, the server being configured to: determine, according to the scene data, whether a predetermined trigger condition of playing a target scene animation is met, and return the control message when the predetermined trigger condition is met, the control message being used to instruct to play the target scene animation.

S3: Playing the target scene animation according to the control message.

Optionally, the storage medium is further configured to store program code for performing the following steps: determining a client time corresponding to the server time; determining a receiving time at which the control message is received; obtaining a time stamp of current play of the target scene animation according to the client time and the receiving time, the time stamp being a time difference between the receiving time and the client time; and starting to play an animation after the time stamp in the target scene animation since the receiving time.

Optionally, the storage medium is further configured to store program code for performing the following steps: obtaining a target time difference from the server; and determining the client time corresponding to the server time according to the target time difference, the client time being a sum of the server time and the target time difference.

Optionally, the storage medium is further configured to store program code for performing the following step: obtaining the target time difference from the server according to the following formula: ActualDelta=Min(ActualDelta, CalcDelta), where CalcDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received; S1 is the server time at which the time comparison packet is received, and ActualDelta is the target time difference.

Optionally, the storage medium is further configured to store program code for performing the following step: obtaining the target time difference from the server according to the following formula: ActualDelta=C1−S1−NetDelay, where NetDelay=(C1−C0)/2, C0 is a time at which a time comparison packet is sent to the server, C1 is a time at which a response message returned by the server in response to the time comparison packet is received, and S1 is a time at which the server receives the time comparison packet.

Optionally, reference may be made to examples described in the Embodiment 1 to Embodiment 5 for optional examples in some embodiments, and details are not described herein again.

Optionally, in some embodiments, the storage medium may include, but is not limited to: any medium that can store program code, such as a USB flash drive, a read only memory (ROM), a random access memory (RAM), a removable hard disk, a magnetic disk, or an optical disc.

The sequence numbers of the preceding embodiments of the present disclosure are merely for description purpose but do not indicate the preference of the embodiments.

If the integrated units in the foregoing embodiments are implemented in a form of software functional units and are sold or used as an independent product, the units may be stored in a computer readable storage medium. Based on such an understanding, the technical solutions of the present disclosure essentially, or the part contributing to the related technologies, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present disclosure.

In the foregoing embodiments of the present disclosure, the descriptions of the embodiments have respective focuses. For a part not described in detail in an embodiment, refer to a related description of another embodiment.

In the several embodiments provided in the present application, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated units may be implemented in a form of hardware or may be implemented in a form of a software functional unit.

The foregoing descriptions are merely optional implementations of present disclosure. It should be pointed out that a person of ordinary skill in the art may further make several improvements and modifications without departing from the principle of the present disclosure. The improvements and modifications should also be considered to fall within the protection scope of the present disclosure.

INDUSTRIAL APPLICABILITY

As can be learned from the foregoing descriptions, in the present disclosure, the scene data sent by the plurality of clients is obtained, and it is determined according to the scene data whether the predetermined trigger condition of playing the target scene animation is met, and the control message is sent to all the clients when the predetermined trigger condition is met, to instruct all the clients to synchronously play the target scene animation, to ensure that play progresses of the scene animation of the application are synchronous, so as to resolve the technical problem in the related technology that play progresses of a scene animation of a same application in a plurality of clients are inconsistent due to factors such as a network delay or jitter, thereby improving use experience of users for the application.

What is claimed is:

1. A method for playing a target scene animation, the method comprising:
obtaining, by a server, scene data corresponding to a plurality of first accounts, the scene data being data generated by a plurality of first clients, each of the plurality of first clients being logged in with one of the plurality of first accounts;
determining, by the server according to the scene data, whether a predetermined trigger condition of playing the target scene animation is met; and
sending, by the server, a control message to each of the plurality of first accounts when the predetermined trigger condition of playing the target scene animation is met, wherein the control message carries a server time at which the server instructs to start to play the target scene animation and is used to instruct each of the plurality of first clients to synchronously play the target scene animation, and wherein the each of the plurality of first clients is configured to play the target scene animation according to the control message by:
obtaining a target time difference (ActualDelta) from the server, and determining a client time according to the target time difference and the server time, the client time being a sum of the server time and the target time difference, wherein the target time difference from the server is obtained according to formula:

ActualDelta=C1−S1 NetDelay, wherein NetDelay= (C1−C0)/2, C0 is a time at which a time comparison packet is sent to the server, C1 is a time at which a response message returned by the server in response to the time comparison packet is received, and S1 is a time at which the server receives the time comparison packet; or ActualDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received, and S1 is the server time at which the time comparison packet is received;

determining a receiving time at which the control message is received;

obtaining a time stamp of current play of the target scene animation according to the client time and the receiving time, the time stamp being a time difference between the receiving time and the client time; and starting to play, at the receiving time, a part of the target scene animation that begins at the time stamp.

2. The method according to claim 1, wherein after the sending the control message to the each of the plurality of first accounts when the predetermined trigger condition of playing the target scene animation is met, the method further comprises:

detecting whether a request message sent by a second account is received, the request messaging being used to request to log in to a second client; and sending the control message to the second account when it is detected that the request message sent by the second account is received, the control message being used to instruct the second client to synchronously play the target scene animation with the plurality of first clients.

3. The method according to claim 1, wherein the predetermined trigger condition comprises at least one of the following:

at least one event object enters a target area, each event object corresponding to one of the plurality of first accounts;

a residence time of the at least one event object in the target area is greater than a predetermined time;

at least one of the plurality of first accounts completes a target task; and an attribute value of at least one of the plurality of first accounts exceeds a predetermined threshold, the attribute value comprising at least one of the following: an account level, an account login time, and an account event resource volume.

4. The method according to claim 1, further comprising:

receiving, by the server and from the each of the plurality of first clients, individual scene data respectively corresponding to the each of the plurality of first accounts, the individual scene data being part of the scene data obtained by the server.

5. A system for playing a target scene animation, the system comprising: a server; and a plurality of terminals respectively configured to execute a plurality of first clients, wherein the system includes a memory, and a processor coupled to the memory, and the processor is configured to:

obtain scene data corresponding to a plurality of first accounts, the scene data being data generated by a plurality of first clients, each of the plurality of first clients being executed at one of a plurality of terminals and logged in with one of the plurality of first accounts;

determine, according to the scene data, whether a predetermined trigger condition of playing the target scene animation is met; and send a control message to each of the plurality of first accounts when the predetermined trigger condition of playing the target scene animation is met, wherein the control message carries a server time at which the server instructs to start to play the target scene animation and is used to instruct each of the plurality of first clients to synchronously play the target scene animation, and wherein the each of the plurality of first clients is configured to play the target scene animation according to the control message by:

obtaining a target time difference (ActualDelta) from the server, and determining a client time according to the target time difference and the server time, the client time being a sum of the server time and the target time difference, wherein the target time difference from the server is obtained according to formula:

ActualDelta=C1−S1 NetDelay, wherein NetDelay= (C1−C0)/2, C0 is a time at which a time comparison packet is sent to the server, C1 is a time at which a response message returned by the server in response to the time comparison packet is received, and S1 is a time at which the server receives the time comparison packet; or ActualDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received, and S1 is the server time at which the time comparison packet is received;

determining a receiving time at which the control message is received;

obtaining a time stamp of current play of the target scene animation according to the client time and the receiving time, the time stamp being a time difference between the receiving time and the client time; and starting to play, at the receiving time, a part of the target scene animation that begins at the time stamp.

6. The system according to claim 5, wherein the processor is further configured to:

after the sending the control message to the each of the plurality of first accounts when the predetermined trigger condition of playing the target scene animation is met, detect whether a request message sent by a second account is received, the request messaging being used to request to log in to a second client executed on one of the plurality of terminals; and send the control message to the second account when it is detected that the request message sent by the second account is received, the control message being used to instruct the second client to synchronously play the target scene animation with the plurality of first clients.

7. The system according to claim 5, wherein the predetermined trigger condition comprises at least one of the following:

at least one event object enters a target area, each event object corresponding to one of the plurality of first accounts;

a residence time of the at least one event object in the target area is greater than a predetermined time;

at least one of the plurality of first accounts completes a target task; and an attribute value of at least one of the plurality of first accounts exceeds a predetermined threshold, the attribute value comprising at least one of the following: an account level, an account login time, and an account event resource volume.

8. The system according to claim 5, wherein the processor is further configured to:

receive individual scene data corresponding to the each of the plurality of first accounts, the individual scene data being part of the scene data obtained by the server.

9. A non-transitory computer-readable storage medium storing computer program instructions executable by at least one processor to perform:

obtaining, scene data corresponding to a plurality of first accounts, the scene data being data generated by a plurality of first clients, each of the plurality of first clients being logged in with one of the plurality of first accounts;

determining, according to the scene data, whether a predetermined trigger condition of playing the target scene animation is met; and sending a control message to each of the plurality of first accounts when the predetermined trigger condition of playing the target scene animation is met, wherein the control message carries a server time at which the server instructs to start to play the target scene animation and is used to instruct each of the plurality of first clients to synchronously play the target scene animation, and wherein the each of the plurality of first clients is configured to play the target scene animation according to the control message by:

obtaining a target time difference (ActualDelta) from the server, and determining a client time according to the target time difference and the server time, the client time being a sum of the server time and the target time difference, wherein the target time difference from the server is obtained according to formula:

ActualDelta=C1−S1−NetDelay, wherein NetDelay=(C1−C0)/2, C0 is a time at which a time comparison packet is sent to the server, C1 is a time at which a response message returned by the server in response to the time comparison packet is received, and S1 is a time at which the server receives the time comparison packet; or ActualDelta=LogicTimeDelta+TransmitDelay, TransmitDelay=S1−S0, LogicTimeDelta=C1−S1, S0 is a time at which the server sends a time comparison packet, C1 is a time at which the time comparison packet sent by the server is received, and S1 is the server time at which the time comparison packet is received;

determining a receiving time at which the control message is received;

obtaining a time stamp of current play of the target scene animation according to the client time and the receiving time, the time stamp being a time difference between the receiving time and the client time; and starting to play, at the receiving time, a part of the target scene animation that begins at the time stamp.

10. The non-transitory computer-readable storage medium according to claim 9, wherein the computer program instructions are executable by the at least one processor to further perform:

after the sending the control message to the each of the plurality of first accounts when the predetermined trigger condition of playing the target scene animation is met, detecting whether a request message sent by a second account is received, the request messaging being used to request to log in to a second client; and sending the control message to the second account when it is detected that the request message sent by the second account is received, the control message being used to instruct the second client to synchronously play the target scene animation with the plurality of first clients.

11. The non-transitory computer-readable storage medium according to claim 9, wherein the predetermined trigger condition comprises at least one of the following:

at least one event object enters a target area, each event object corresponding to one of the plurality of first accounts;

a residence time of the at least one event object in the target area is greater than a predetermined time;

at least one of the plurality of first accounts completes a target task; and an attribute value of at least one of the plurality of first accounts exceeds a predetermined threshold, the attribute value comprising at least one of the following: an account level, an account login time, and an account event resource volume.

12. The non-transitory computer-readable storage medium according to claim 9, wherein the computer program instructions are executable by the at least one processor to further perform:

receiving, from the each of the plurality of first clients, individual scene data respectively corresponding to the each of the plurality of first accounts, the individual scene data being part of the scene data obtained by the server.

* * * * *